R. ZAWERICZ.
TROLLEY WHEEL MOUNT.
APPLICATION FILED MAY 6, 1914.
1,136,199.
Patented Apr. 20, 1915.
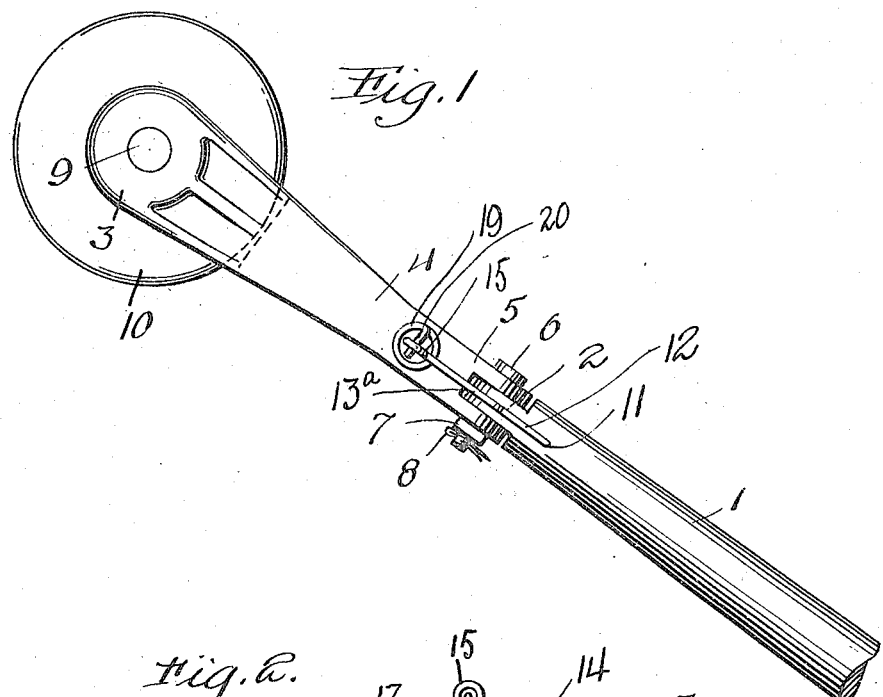
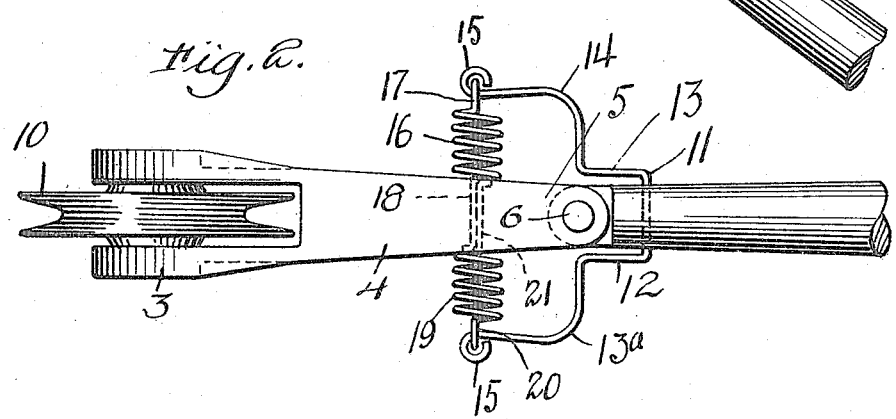

UNITED STATES PATENT OFFICE.

ROMAN ZAWERICZ, OF BENTLEYVILLE, PENNSYLVANIA.

TROLLEY-WHEEL MOUNT.

1,136,199.  Specification of Letters Patent.  Patented Apr. 20, 1915.

Application filed May 6, 1914. Serial No. 836,772.

*To all whom it may concern:*

Be it known that I, ROMAN ZAWERICZ, a citizen of the United States of America, residing at Bentleyville, in the county of Washington and State of Pennsylvania, have invented certain new and useful Improvements in Trolley-Wheel Mounts, of which the following is a specification, reference being had therein to the accompanying drawing.

This invention relates to a trolley wheel mount and has for its object to provide a device of such class, with means for maintaining the trolley wheel in contact with the trolley wire, especially when rounding curves.

Further objects of the invention are to provide a trolley which is simple in its construction and arrangement, strong, durable, efficient and convenient in its use, readily set up, and comparatively inexpensive to manufacture.

With the foregoing and other objects in view, the invention consists of a novel construction, combination and arrangement of parts as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views: Figure 1 is a side elevation of the trolley in accordance with this invention, the pole being broken away. Fig. 2 is a top plan view thereof, the pole being broken away.

Referring to the parts in detail, 1 denotes the trolley pole, provided at its upper end with a reduced extension 2, and 3 denotes a harp, formed with an extension 4 having a bifurcated lower end 5, which straddles the extension 2. The bifurcated lower end 5 of the stem 4 is pivotally connected to the extension 2, through the medium of a threaded bolt 6, which extends through the end 5 and extension 2, and is provided with a nut 7, which is maintained in position by a cotter pin 8. Fixed in the arms of the harp 3 is a shaft 9, upon which is mounted a revoluble trolley wheel 10.

Extending through the pole end of the trolley wheel, near pole extension 2, is the base 11, of the supporting member, and the latter further includes a pair of arms, 12, 12, which project from each end of the base 11 and terminating in angle shaped supporting elements 13, 14 respectively and each of said elements 13, 14 is provided with an eye 15.

Interposed between the stem 4 and one of the elements 14 is a coiled spring 16, having one end as at 17, loosely connected to an eye 15 and its other end as at 18, anchored in the stem 4. Interposed between the element 13 and the stem 4 is a coiled spring 19 having one of its ends as at 20, loosely connected to the eye 15 of the element 13 and its other end as at 21, anchored in the stem 4.

The function of the springs 16, 19 is to normally restore the stem 4 to position in alinement with the pole 1, after the stem 4 has shifted in either direction upon its pivot.

What I claim is:

A trolley wheel mount comprising a pole, a harp having a stem pivoted to the pole on substantially a vertical axis, a substantially U-shaped supporting member formed of wire and having its base loosely mounted in said pole adjacent the pivot point, and the arms thereof projected outwardly on each side of the stem, the free ends of said arms being hooked to form eyes, and a pair of coil springs, one being disposed on each side of the stem, the outer end coils of said springs being loosely engaged with the eyes of the adjacent arms of the supporting member and the inner end coils thereof being anchored together in said stem.

In testimony whereof I affix my signature in the presence of two witnesses.

ROMAN ZAWERICZ.

Witnesses:
 C. K. FRYE,
 JOHN NOVAK.

Copies of this patent may be obtained for five cents each, by addressing the "Commissioner of Patents, Washington, D. C."